United States Patent
Eder et al.

(10) Patent No.: US 12,388,334 B2
(45) Date of Patent: Aug. 12, 2025

(54) ELECTRICAL INSULATION SYSTEM OF AN ELECTRIC MOTOR AND PRODUCTION METHOD FOR SAID ELECTRICAL INSULATION SYSTEM

(71) Applicant: Innomotics GmbH, Nuremberg (DE)

(72) Inventors: Florian Eder, Erlangen (DE); Janis Heller, Bad Neustadt (DE); Tobias Katzenberger, Bad Königshofen STT Untereßfeld (DE); Bastian Plochmann, Neustadt an der Aisch (DE)

(73) Assignee: INNOMOTICS GMBH, Nuremberg (DE)

( * ) Notice: Subject to any disclaimer, the term of this patent is extended or adjusted under 35 U.S.C. 154(b) by 953 days.

(21) Appl. No.: 17/052,652

(22) PCT Filed: Apr. 30, 2019

(86) PCT No.: PCT/EP2019/061044
§ 371 (c)(1),
(2) Date: Nov. 3, 2020

(87) PCT Pub. No.: WO2019/211274
PCT Pub. Date: Nov. 7, 2019

(65) Prior Publication Data
US 2021/0242758 A1   Aug. 5, 2021

(30) Foreign Application Priority Data
May 4, 2018  (EP) ..................... 18170761

(51) Int. Cl.
| | | |
|---|---|---|
| H02K 3/30 | (2006.01) |
| B29C 70/28 | (2006.01) |
| B29C 70/68 | (2006.01) |
| H02K 3/34 | (2006.01) |
| H02K 15/10 | (2025.01) |
| H02K 15/12 | (2025.01) |
| B29L 31/00 | (2006.01) |

(52) U.S. Cl.
CPC ............. *H02K 15/12* (2013.01); *B29C 70/28* (2013.01); *B29C 70/68* (2013.01); *H02K 3/30* (2013.01); *H02K 3/34* (2013.01); *H02K 15/105* (2013.01); *B29K 2995/0007* (2013.01); *B29L 2031/749* (2013.01)

(58) Field of Classification Search
CPC ............ H02K 15/12; H02K 3/30; H02K 3/34; H02K 15/105; B29C 70/28; B29C 70/68; B29K 2995/0007; B29L 2031/749
See application file for complete search history.

(56) References Cited

U.S. PATENT DOCUMENTS

2015/0044924 A1   2/2015   Yi et al. ........................ 442/1

FOREIGN PATENT DOCUMENTS

| DE | 31 33 811 | 3/1983 | ............... H02K 3/48 |
| DE | 3133811 A1 * | 3/1983 | |
| DE | 200 09 286 | 10/2000 | ............... H01B 7/02 |
| EP | 3151248 A1 | 4/2017 | ............... H01B 3/04 |
| WO | 91/12133 A1 | 8/1991 | ............. B32B 27/04 |

OTHER PUBLICATIONS

[NPL-1] Siemens (DE 3133811 A1); Mar. 17, 1983 (EPO machine translation to English). (Year: 1983).*
Search Report for International Application No. PCT/EP2019/061044, 13 pages, Aug. 5, 2019.
Search Report for EP Application No. 18170761.3, 9 pages, Oct. 29, 2018.
UHU: "Sicherheitsdatenblatt gemäß 1907/2006/EG", Artikel 31, pp. 1-7, XP055516378, gefunden im Internet: URL:http://www.i-m.de/gefahrstoffe/256460.pdf; gefunden am Oct. 17, 2018, p. 4, Jun. 16, 2010.
Chinese Office Action, Application No. 201980037824.7, 6 pages, May 27, 2023.
Chinese Office Action, Application No. 201980037824.7, 6 pages, Jan. 5, 2023.

* cited by examiner

*Primary Examiner* — Donald M Flores, Jr.
(74) *Attorney, Agent, or Firm* — Slayden Grubert Beard PLLC

(57) ABSTRACT

Various embodiments include an electrical insulation system for an electric motor comprising: a laminated core having slots and wire windings; an surface electrical insulation in the slots surrounding individual wires with a potting compound; and an absorbent material between the individual wires and within the wire winding bounded by surface insulation material. The absorbent material took up liquid impregnation resin during the manufacturing process. The liquid impregnation resin has cured and now forms the potting compound.

9 Claims, No Drawings

ELECTRICAL INSULATION SYSTEM OF AN ELECTRIC MOTOR AND PRODUCTION METHOD FOR SAID ELECTRICAL INSULATION SYSTEM

CROSS-REFERENCE TO RELATED APPLICATIONS

This application is a U.S. National Stage Application of International Application No. PCT/EP2019/061044 filed Apr. 30, 2019, which designates the United States of America, and claims priority to EP Application Serial No. 18170761.3 filed May 4, 2018, the contents of which are hereby incorporated by reference in their entirety.

TECHNICAL FIELD

The present disclosure relates to electrical insulation. Various embodiments include insulation systems for electric motors and/or production methods for electrical insulation systems for electric motors.

BACKGROUND

Laminated cores of electric motors typically comprise slots with a wire winding, generally a copper wire winding, wherein the wire is electrically insulated by a wire enamel and surface insulation material forming the winding. Depending on size and power class, there are different possible ways of producing electric motors. With a dimension of axis height 63 mm to 450 mm and at powers of 150 W to 1.6 MW, the stator, as it is known, i.e. the laminated core is typically equipped with pre-wound conductors.

These windings are mechanically pulled into the stator slots and subsequently connected. The electrical insulation of the individual wires with respect to one another and with respect to the laminated core at ground potential is provided by surface insulation materials, such as winding paper, and the wire enamel of the individual winding wires. On account of the geometric requirements of the slots, such as the slot tooth, which serves to form magnetic field lines that are as closed as possible, maximum slot filling of 85% by volume with copper wire including wire enamel is possible, since otherwise the pull-in forces for example would become too great and thus the surface insulation, i.e. for example the winding paper and/or the wire enamel could be damaged, for example by scratches, cracks and/or by stretching.

As a result, at least 15% by volume of free volume remains in the slots of the laminated core, part thereof within the conductor and part thereof between the conductor and the slot inner side, for example in the corners, wherein the conductor does not bear exactly against the slot inside edge. The part of the free volume that is located within the conductor should optimally be filled as completely as possible by impregnation with impregnation resin.

To this end, as a rule, impregnation methods such as dipping methods are used, in which one or more stators are slowly dipped in a liquid impregnation resin basin in order that the liquid impregnation resin can flow into the cavities between the individual wires of the conductor and the laminated core and fill these cavities. Subsequently, the stators impregnated in this way are cured by the action of temperature and/or UV irradiation for a particular period of time. As a result, the potting is produced, for example in the form of a fully cured thermoset, as potting compound from the liquid and/or gelled impregnation resin, which, in the dipping bath, fills the remaining cavities in the slots, in the volume that is still empty within the conductor. The quality of the impregnation is ultimately defined by as high a degree of filling of the cavities as possible and as low a residual enthalpy of the impregnation resin as possible. Optimal here are, firstly, cavities in the conductor that are completely filled with impregnation resin and, secondly, complete crosslinking of the impregnation resin.

A drawback here is that, for the impregnation of different stator types, the rheology and the chemical reactivity of the impregnation resin have to be set for the particular stator type in order that complete filling of the cavities, for example in the dipping bath, is also ensured. Depending on the stator type, a higher or lower viscosity is demanded, in order that the cavities are filled completely with the impregnation resin and at the same time rapid gelling occurs, which then prevents the impregnation resin from running off again when the stator is removed from the dipping bath. In order that different stator types can be impregnated in an economical manner in a common dipping bath, the rheology, viscosity and/or the chemical composition of the dipping bath is set to an average value without optimization with regard to one stator type.

SUMMARY

The teachings of the present disclosure include targeted filling of the conductor, in particular of the wire winding of a stator with impregnation resin without any chemical change to the impregnation resin in the dipping bath in terms of rheology, viscosity and/or gelling times. For example, some embodiments include an electrical insulation system EIS for an electric motor, comprising a laminated core having slots and wire windings, electrically surface insulated in these slots, with individual wires in a potting compound, wherein there is absorbent material between the wires of the wire winding and/or around the individual wires but within the wire winding bounded by surface insulation material, said absorbent material being suitable for taking up liquid impregnation resin that forms the potting compound after it has cured and the EIS has been completed.

In some embodiments, the absorbent material at least partially comprises a foam.

In some embodiments, the absorbent material at least partially comprises fibers.

In some embodiments, the absorbent material at least partially comprises endless fibers.

In some embodiments, the absorbent material at least partially comprises long fibers.

In some embodiments, absorbent material in the form of fibers is wound simultaneously with the winding wires to form a conductor.

In some embodiments, the proportion of absorbent material in the conductor is in the range of up to 26% by volume of the total volume in the conductor.

In some embodiments, comprises fibers that have been at least partially surface treated.

In some embodiments, comprises fibers that have been surface treated with adhesive.

As another example, some embodiments include a method for producing an electrical insulation system for an electric motor, comprising: winding a conductor from winding wire that is surrounded with wire enamel, wherein absorbent material is contained in the fully wound conductor, introducing the conductor produced in this way into the slots of a laminated core, dipping the wound laminated core in an impregnation resin, and curing the impregnated laminated core.

In some embodiments, at least also fibers are used as absorbent material.

In some embodiments, between the pulling of the conductor into the slots of the laminated core and the dipping of the laminated core in the impregnation resin, there is interconnected an intermediate step for heating the laminated core.

In some embodiments, fibers having a surface adhesive coating are introduced into the conductor, wherein the adhesive has been at least partially selected such that it breaks down and/or evaporates during the intermediate heating step.

DETAILED DESCRIPTION

Some embodiments of the teachings herein include an electrical insulation system EIS for an electric motor, comprising a laminated core having slots and wire windings, electrically surface insulated in these slots, with individual wires in a potting compound, wherein absorbent material is provided between the wires of the wire winding and/or around the individual wires but within the wire winding bounded by surface insulation material, said absorbent material being suitable for taking up liquid impregnation resin that forms the potting compound after it has cured and the EIS has been completed.

Some embodiments include methods for producing an electrical insulation system EIS for an electric motor, comprising:
  winding a conductor from wire that is surrounded with wire enamel, wherein absorbent material is contained in the fully wound conductor,
  introducing the conductor produced in this way into the slots of a laminated core,
  dipping the wound laminated core in an impregnation resin, and
  curing the impregnated laminated core.

As a result of the introduction of absorbent material, for example in the form of a foam, in the form of fibers and/or fiber parts, such as polymeric fibers, between the wires and/or around the wires of a wound conductor, this acts like a sponge upon contact with liquid impregnation resin and, under certain circumstances, even takes up liquid impregnation resin while increasing in volume and/or keeps it in position, i.e. keeps it for example within the wire winding with or without gelling. As a result—with regard to the impregnation resin for example in the dipping bath—the filling of the cavities in the wire winding is ensured equally well in a wide viscosity range. The setting of specific gelling properties of the impregnation resin—for example in the dipping bath—is superfluous as a result, since the liquid and non-gelled impregnation resin is kept in position by the capillary forces of the absorbent material even without early surface gelling.

In some embodiments, the absorbent material is in the form of fibers. In this case, the fibers can be long fibers and/or endless fibers. The fibers can then, just like the conducting wires, be wound and form a wound conductor with the conducting wires.

The term "conductor" denotes in the present case a winding of wires that are wound together in surface insulation material, for example paper, and form a bundle of winding wires that is pulled into a slot of a laminated core. If a conductor is cut open in cross section, in the best case, circles are seen that show the diameters of the wires that form a "densest" packing in the conductor, similar to the densest sphere packing in a crystal. In a similar way to the density ratio of the densest sphere packing, which is 74%, it is assumed in the present case that the remaining 26% by volume of cavity in the conductor is fillable with absorbent material. In some embodiments, the method fills as much as possible of this cavity, which cannot be used by the wires anyway for dimension reasons, with absorbent material.

In some embodiments, the fibers are wound at the same time as the bundling of the winding wires, in particular of the copper wires, and thus present between the copper wires in the conductor together with said copper wires in the winding and in the finished electric motor.

In some embodiments, the number of fiber windings in relation to the copper wire windings is selected such that no space in the slot and/or in the conductor that would be fillable with copper wire is taken up thereby. The number of fiber windings is accordingly chosen in the voltage field as a tradeoff between high enough for there to be as complete impregnation of the stator assembly as possible after curing and as low as possible in order that the degree of volume filling in the wire winding with conducting material, in particular with conductive winding wire, preferably with copper wire, is not impaired thereby.

In the winding process, the fibers are laid primarily in the cavities between the wires and therefore do not reduce the degree of volume filling or reduce it only insignificantly. As a result of the tensile forces during the winding process, the individual fibers are additionally stretched and are thus reduced in diameter. For example, long and/or endless fibers are present in the conductor in the ratio of one fiber per ten wires. In particular, the fiber to wire ratio in the conductor lies in the region of 1 to 10, as described above, up to the region of 2 to 1, i.e. more fibers than wires in the conductor. The respective proportions depend for example on the absorbency of the fiber, the diameter of the fiber etc.

In some embodiments, the fibers, in addition to the bundling or as an alternative thereto, are laid, pulled and/or spun around the winding wires. In some embodiments, the fibers, in addition to the winding or as an alternative thereto, are introduced into the winding wire by being sprayed in and/or being introduced in some other way in the form for example of a foam and/or short and/or ultra-short fibers.

In some embodiments, the fibers have themselves been surface treated. For example, the surface treatment serves to allow the fibers to be wound more easily with the winding wires, which have a wire enamel on their surface. The surface treatment of the fibers serves to allow the fibers to slide better on the wire enamel of the insulation of the winding wires. As a result, the fibers can be wound better and more easily together with the winding wires. For example, the winding wires have been surface treated with an adhesive so as to bring about easier adhesion of the fibers to the wire enamel, with the result that the fibers adhere better in the winding bundle until winding, i.e. until the wire/fiber bundle has been fastened or laid in the slot by the introduction process.

For example, the adhesive is selected from adhesives of the following group: spray adhesives, Uhu, Tesa, 3M, and any desired adhesive mixtures of the abovementioned and/or supplementary adhesive kinds. When choosing a suitable adhesive, in particular questions arise, such as the compatibility with the impregnation resin, the completeness of crosslinking of the adhesive, the adhesive action and/or whether the adhered fiber is attached in a repositionable and/or releasable manner. The chemical basis of the adhesives that come into question also extends in particular to acrylic adhesives.

The proportion of adhesive may be specifically selected to be high enough for the yarn to remain in the winding composite during winding, i.e. the winding process, and not to separate. Thus, a majority of the individual fibers are free and form a very large surface in the otherwise empty intermediate space between the winding wires, in particular the copper wires.

In some embodiments, the fiber is first of all compacted for example by the adhesive such that the effective volume of the fiber is lower during winding. In this case, an adhesive is selected that is at least partially removable again, i.e. evaporates, vaporizes and/or breaks down into gaseous products, during the preheating phase of the stator—in particular advantageously again before the actual impregnation of the stator. The fiber that is then free of adhesive again can then fan out and/or swell up again and then exhibits so to speak an optimum level of absorbency and capillary forces for taking up impregnation resin.

The liquid impregnation resin, which arrives at the fiber and the wire winding—for example via the dipping of the stator in a dipping bath—is thus pulled into the intermediate spaces between the wires of the wire winding via the capillary forces of the fiber and/or by the fiber swelling up, and is kept there. As a result, extensive thixotroping is no longer necessary and the chemical basis can be simplified in that an exact gelling process for mechanically fixing the liquid impregnation resin in the conductor is no longer necessary. The viscosity can be chosen to be lower overall, since the impregnation resin is at least partially prevented from running back as a result of the capillary forces of the fibers located between the wire windings.

The flowing of the impregnation resin on the outer sides is also accelerated and improved as a result because the gelling properties of the impregnation resin are no longer set so critically in the highest possible range. This means that the impregnation resin no longer gels so quickly and can therefore flow better. During the impregnation of the winding head, additional advantages can arise, since the available spaces between the wire gaps fill with resin in a defined manner on account of the fibers. In particular during operation on an inverter, a longer service life at high voltage spikes, caused by the inverter, arises as a result of the impregnation resin additionally introduced by means of the fiber, and the additional potting formed therefrom.

Virtually complete impregnation of a wire/fiber winding, such as a stator winding, according to the present invention, i.e. the filling of air pockets with impregnation resin, allows much better heat dissipation in the winding. In some embodiments, by way of cost-effective materials and minor changes to the manner of production such as the additional fiber in the conventional winding process, the non-impregnated stators are conditioned such that they can be impregnated more efficiently and cost-effectively. Here, the major advantage resides in particular in the then available manufacturing variability of a single impregnation layer.

As a result of the introduction of the fibers into the cavities of the winding, capillary effects arise that keep the liquid impregnation resin preferably in the intermediate spaces between the wires. Here, the introduction of the fibers can be integrated readily into the preceding winding process without significantly changing the latter. The impregnation process can be temporally optimized, since the process duration used to depend mainly on the gelling time, but, on account of the abovementioned capillary effects, it is no longer necessary to wait until gelling is complete. The impregnation resin can be obtained more cost-effectively since the technical requirements such as gelling time, thixotroping and/or exactly defined reaction process are much lower.

The manufacturing variability increases, since the abovementioned points are no longer decisive and therefore stators with different axis heights can be run in the same system/the same process. Since less pre-reacted and potentially contaminated resin drips out of the stator back: into the resin basin, less cleaning and/or regulating effort is necessary. In addition, the waste can be reduced. The teachings herein provide for the first time a possible way of realizing, in a cost-effective manner, as complete impregnation of a wire winding of an electric motor as possible by the introduction of fibers.

What is claimed is:

1. An electrical insulation system for an electric motor, the system comprising:
   a laminated core having slots and windings including a plurality of individual wires;
   an electrical surface insulation material in the slots surrounding individual wires, the electrical surface insulation material including a potting compound; and
   an absorbent material distributed between the individual wires and within the slots and bounded by the electrical surface insulation material;
   wherein an amount of the absorbent material is selected to maximize the amount of absorbent material present in a slot while a number of the individual wires in a respective slot is equal to a maximum possible number of individual wires in the slot if no absorbent material were present;
   wherein the absorbent material comprises a foam and/or a fiber acting as a sponge and swelling upon contact with a liquid impregnation resin during a manufacturing process; and
   wherein the liquid impregnation resin has cured and now forms the potting compound.

2. The insulation system as claimed in claim 1, wherein the absorbent material comprises a foam.

3. The insulation system as claimed in claim 1, wherein the absorbent material comprises fibers.

4. The insulation system as claimed in claim 1, wherein the absorbent material comprises endless fibers.

5. The insulation system as claimed in claim 1, wherein the absorbent material comprises long fibers.

6. The insulation system as claimed in claim 1, wherein the absorbent material comprises fibers wound with the winding wires to form a conductor.

7. The insulation system as claimed in claim 1, wherein a proportion of absorbent material in a respective slot is in the range of up to 26% of the total volume in the respective slot.

8. The insulation system as claimed in claim 1, wherein the absorbent material comprises fibers that have been at least partially surface treated.

9. The insulation system as claimed in claim 1, wherein the absorbent material comprises fibers that have been surface treated with adhesive.

* * * * *